(12) United States Patent
Murakami

(10) Patent No.: US 9,860,373 B2
(45) Date of Patent: Jan. 2, 2018

(54) CALLER IDENTIFICATION APPARATUS, CALLER IDENTIFICATION METHOD, AND RECORDING MEDIUM ON WHICH CALLER IDENTIFICATION PROGRAM HAS BEEN STORED

(71) Applicant: NEC Corporation, Tokyo (JP)

(72) Inventor: Tomoki Murakami, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 15/319,237

(22) PCT Filed: Jun. 12, 2015

(86) PCT No.: PCT/JP2015/002957
§ 371 (c)(1),
(2) Date: Dec. 15, 2016

(87) PCT Pub. No.: WO2015/194148
PCT Pub. Date: Dec. 23, 2015

(65) Prior Publication Data
US 2017/0126885 A1  May 4, 2017

(30) Foreign Application Priority Data
Jun. 17, 2014 (JP) .................. 2014-124446

(51) Int. Cl.
*H04M 1/64* (2006.01)
*H04M 3/42* (2006.01)
(Continued)

(52) U.S. Cl.
CPC ......... *H04M 3/42059* (2013.01); *G10L 17/02* (2013.01); *G10L 17/06* (2013.01);
(Continued)

(58) Field of Classification Search
CPC . H04M 3/4205; H04M 3/42059; G10L 17/02; G10L 17/06; G10L 17/22
See application file for complete search history.

(56) References Cited

U.S. PATENT DOCUMENTS 7,721,109 B1* 5/2010 Herder .................... G06F 21/32
705/64
2004/0240631 A1 12/2004 Broman et al.
(Continued)

FOREIGN PATENT DOCUMENTS

JP  S63-232563 A  9/1988
JP  2005-341383 A  12/2005
(Continued)

OTHER PUBLICATIONS

International Search Report corresponding to PCT/JP2015/002957, dated Jul. 7, 2015 (4 total pages).
(Continued)

*Primary Examiner* — Simon King
(74) *Attorney, Agent, or Firm* — Wilmer Cutler Pickering Hale and Dorr LLP

(57) ABSTRACT

A caller identification apparatus, in order to make, with higher precision, a sharp distinction between a call from a fraud and a call from a person who is not a fraud, comprises a storage means and a voice characteristic analysis means. The storage means stores both a white list with which first voice characteristic information, which is the voice characteristic information of closely related persons of a call recipient, is registered and a black list with which second voice characteristic information, which is the voice characteristic information of frauds, is registered. The voice characteristic analysis means acquires the voice data of a call, obtains third voice characteristic information, which is the voice characteristic information of the voice data, and determines whether the third voice characteristic information (Continued)

matches the first voice characteristic information or the second voice characteristic information. If the third voice characteristic information matches neither the first voice characteristic information nor the second voice characteristic information, the voice characteristic analysis means determines whether the third voice characteristic information includes the voice characteristic information of any multiple persons. If the third voice characteristic information includes the voice characteristic information of any multiple persons, the voice characteristic analysis means obtains a first determination result that the call is probably a call from said frauds.

10 Claims, 4 Drawing Sheets

(51) Int. Cl.
*G10L 17/06* (2013.01)
*G10L 17/22* (2013.01)
*G10L 17/02* (2013.01)

(52) U.S. Cl.
CPC ......... *G10L 17/22* (2013.01); *H04M 3/42221* (2013.01); *H04M 2201/405* (2013.01); *H04M 2203/6027* (2013.01)

(56) References Cited

U.S. PATENT DOCUMENTS

| | | |
|---|---|---|
| 2011/0016363 A1 | 1/2011 | Washio |
| 2013/0253919 A1 | 9/2013 | Gutierrez et al. |
| 2014/0330563 A1* | 11/2014 | Faians .................... G10L 17/04 704/236 |
| 2016/0365095 A1* | 12/2016 | Lousky .................. G10L 17/04 |

FOREIGN PATENT DOCUMENTS

| | | |
|---|---|---|
| JP | 2008-210085 A | 9/2008 |
| JP | 2010-268173 A | 11/2010 |
| JP | 2010-273130 A | 12/2010 |
| JP | 2011-023903 A | 2/2011 |
| JP | 2012-050034 A | 3/2012 |
| JP | 2012-134647 A | 7/2012 |
| JP | 2013-005205 A | 1/2013 |

OTHER PUBLICATIONS

Japanese Notification of Reasons for refusal issued in Japanese Patent Application No. 2016-529035, dated Nov. 14, 2017, 5 pages.

\* cited by examiner

CALLER IDENTIFICATION APPARATUS, CALLER IDENTIFICATION METHOD, AND RECORDING MEDIUM ON WHICH CALLER IDENTIFICATION PROGRAM HAS BEEN STORED

CROSS REFERENCE TO RELATED APPLICATIONS

This application is a national stage application of International Application No. PCT/JP2015/002957 entitled "CALLER IDENTIFICATION APPARATUS, CALLER IDENTIFICATION METHOD, AND RECORDING MEDIUM ON WHICH CALLER IDENTIFICATION PROGRAM HAS BEEN STORED", filed on Jun. 12, 2015, which claims the benefit of the priority Japanese Patent Application No. 2014-124446, filed on Jun. 17, 2014, the disclosures of each of which are hereby incorporated by reference in their entirety.

TECHNICAL FIELD

The present invention relates to a caller identification apparatus identifying a caller, a caller identification method, and a recording medium on which a caller identification program is stored.

BACKGROUND ART

Recently, frauds (what are called bank transfer fraud, "it's me" fraud, "help me, mother" fraud, and the like) for swindling money and goods by pretending to be a relative have increased. For this reason, various measures for preventing such frauds are proposed.

PTL 1 describes a technique in which voice characteristics (voiceprint or the like) of a swindler are recorded in a swindler voice database in advance, and when voice characteristics of received call voice data coincide with the voice characteristics recorded in the database, the call is determined as a call from the swindler. In addition, PTL 2 describes a technique of recording an amount of individuality characteristic of a close relative in a storage unit in advance, determining whether or not an amount of individuality characteristic of a caller coincides with the amount of individuality characteristic recorded in the storage unit, and, when determining non-coincidence, notifying a call recipient (such as an elderly person living alone) of the result.

CITATION LIST

Patent Literature

[PTL 1] Japanese Patent Application Laid-open Publication No. 2008-210085 (pages 11 and 12)
[PTL 2] Japanese Patent Application Laid-open Publication No. 2005-341383 (pages 7 and 8)

SUMMARY OF INVENTION

Technical Problem

In the case of the determination method of PTL 1, any call that does not coincide with the swindler voice database is determined as a normal call. There is, however, possibility that calls that do not coincide with the swindler voice database actually include a call from a swindler such as a new swindler, for example.

Meanwhile, in the case of the method of determining, as a call from a swindler, any call which has an amount of individuality characteristic that does not coincide with an amount of individuality characteristic of a close relative as in PTL 2, a call from a swindler is completely blocked. However, in the case of PTL 2, there is possibility that a person (such as a coworker calling a recipient for the first time) who is not recorded as a close relative and is not a swindler is also determined as a swindler.

In other words, in the case of a simple alternative determination method as described above, there occurs a problem that a call from a swindler supposed to be detected is overlooked, a problem that a person who is not a swindler is determined as a swindler, or the like.

The present invention is made to solve the above-described problem, and an object of the present invention is to provide a caller identification apparatus, a caller identification method, and a recording medium on which a caller identification program is stored, capable of sharply distinguishing a call from a swindler and a call from a non-swindler from each other with higher accuracy.

Solution to Problem

A caller identification apparatus, according to the present invention, comprises: storage means for storing a white list in which first voice characteristic information that is voice characteristic information of a close relative of a call recipient is recorded, and a black list in which second voice characteristic information that is voice characteristic information of a swindler is recorded; and voice characteristic analysis means for acquiring voice data of a call, obtaining third voice characteristic information that is voice characteristic information of the voice data, determining whether or not the third voice characteristic information coincides with the first voice characteristic information and the second voice characteristic information, determining, when the third voice characteristic information coincides with neither the first voice characteristic information nor the second voice characteristic information, whether or not the third voice characteristic information includes voice characteristic information of a plurality of persons, and obtaining, when the third voice characteristic information includes voice characteristic information of a plurality of persons, a first determination result that the call has high possibility of being a call from the swindler.

A caller identification method, according to the present invention, comprises: storing, in storage means, a white list in which first voice characteristic information that is voice characteristic information of a close relative of a call recipient is recorded, and a black list in which second voice characteristic information that is voice characteristic information of a swindler is recorded; acquiring voice data of a call, obtaining third voice characteristic information that is voice characteristic information of the voice data, and determining whether or not the third voice characteristic information coincides with the first voice characteristic information and the second voice characteristic information; when the third voice characteristic information coincides with neither the first voice characteristic information nor the second voice characteristic information, determining whether or not the third voice characteristic information includes voice characteristic information of a plurality of persons; and when the third voice characteristic information includes voice characteristic information of a plurality of persons, obtaining a first determination result that the call has high possibility of being a call from the swindler.

A recording medium, according to the present invention, on which a caller identification program is stored, the program causing a computer of a caller identification apparatus to execute: processing of storing, in storage means, a white list in which first voice characteristic information that is voice characteristic information of a close relative of a call recipient is recorded, and a black list in which second voice characteristic information that is voice characteristic information of a swindler is recorded; processing of acquiring voice data of a call, obtaining third voice characteristic information that is voice characteristic information of the voice data, and determining whether or not the third voice characteristic information coincides with the first voice characteristic information and the second voice characteristic information; processing of, when the third voice characteristic information coincides with neither the first voice characteristic information nor the second voice characteristic information, determining whether or not the third voice characteristic information includes voice characteristic information of a plurality of persons; and processing of, when the third voice characteristic information includes voice characteristic information of a plurality of persons, obtaining a first determination result that the call has high possibility of being a call from the swindler.

Advantageous Effects of Invention

According to the present invention, a call from a swindler and a call from a non-swindler can be sharply distinguished from each other with higher accuracy.

DESCRIPTION OF EMBODIMENTS

Figure 1:
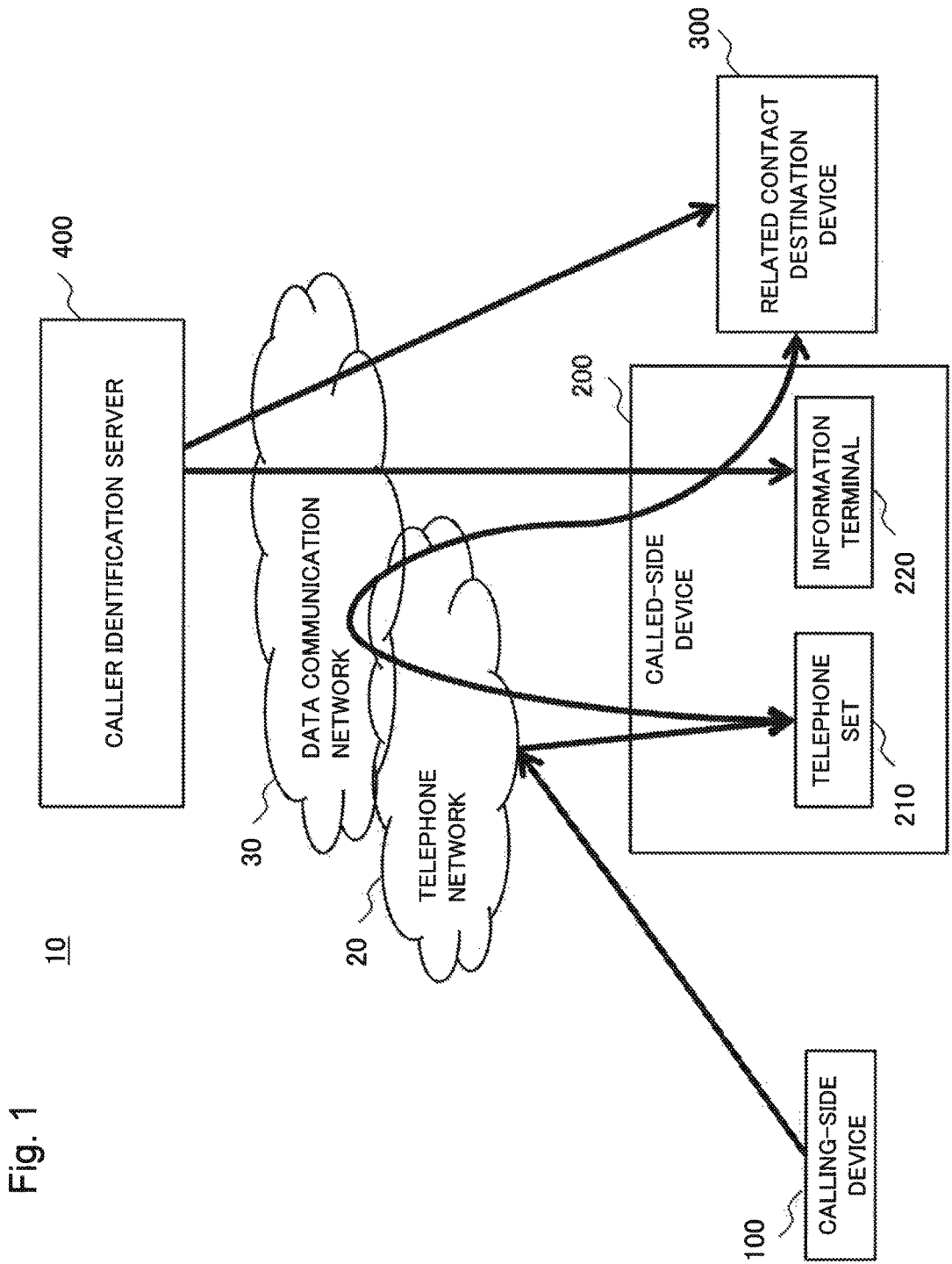
FIG. 1 is a block diagram illustrating a configuration example of a call system according to a first exemplary embodiment of the present invention.

First Exemplary Embodiment (Description of Configuration)
FIG. 1 is a block diagram illustrating a configuration example of a call system 10 according to a first exemplary embodiment of the present invention. The call system 10 includes a calling-side device 100, a called-side device 200, a related contact destination device 300, and a caller identification server 400 (caller identification apparatus).

The calling-side device 100, the called-side device 200, and the related contact destination device 300 are connected to each other via a telephone network 20. Further, the telephone network 20, the caller identification server 400, the called-side device 200, and the related contact destination device 300 are connected to each other via a predetermined data communication network 30 (such as the Internet).

The calling-side device 100 includes at least a telephone set (not illustrated in FIG. 1) operated by a caller.

The called-side device 200 includes a telephone set 210 and an information terminal 220. The telephone set 210 is a telephone set operated by a call recipient. The information terminal 220 is a terminal (such as a personal computer) for communicating with a device (such as the caller identification server 400) connected to the data communication network 30. The information terminal 220 has at least a function of communicating with the device connected to the data communication network 30, and an expression function of visually displaying or phonetically displaying predetermined information. For example, the information terminal 220 receives a "call type" described below from the caller identification server 400, and displays this call type on a screen.

The related contact destination device 300 is capable of communicating with at least the caller identification server 400 via the data communication network 30. Herein, the related contact destination is for example, a family member of the call recipient, a service center operated by a business operator providing a telephone service, the police, or the like.

Figure 2:
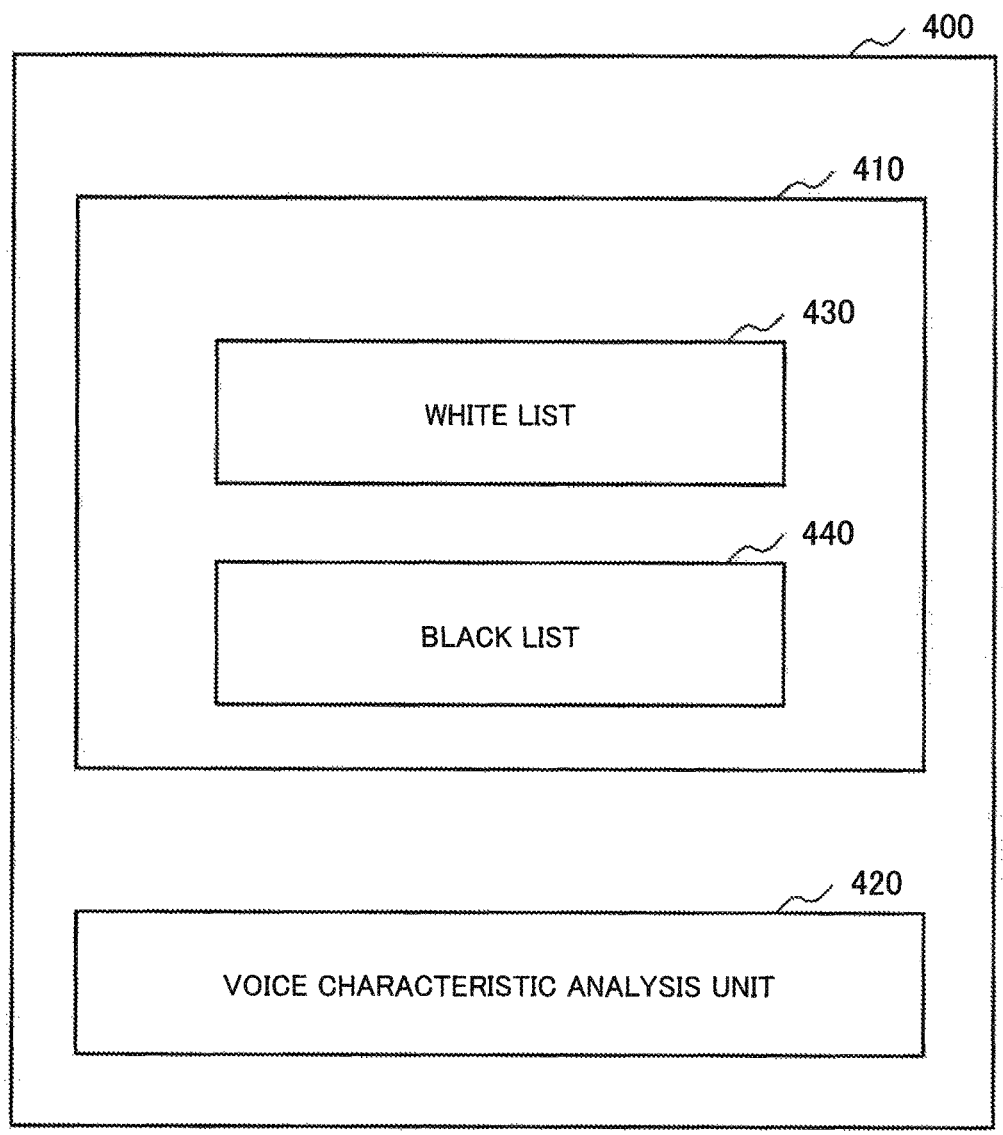
FIG. 2 is a block diagram illustrating a configuration example of a caller identification server.

FIG. 2 is a block diagram illustrating a configuration example of the caller identification server 400. The caller identification server 400 includes a storage unit 410 (a storage means) and a voice characteristic analysis unit 420 (a voice characteristic analysis means). In the present exemplary embodiment, description is made by exemplifying a case in which the voice characteristics are "voiceprint". Of course, the voice characteristics are not limited to the voiceprint only.

The storage unit 410 stores a white list 430 and a black list 440. In the white list 430, voice characteristic information (such as voiceprint information) of a close relative (such as a family member or a friend) of a call recipient is recorded in advance. In the black list 440, voiceprint information of a criminal such as a swindler, or of a person suspected of a crime is recorded in advance.

The voice characteristic analysis unit 420 acquires voice data of a caller, from the telephone network 20 via the data communication network 30. The voice characteristic analysis unit 420 extracts voiceprint information from the acquired voice data. The voice characteristic analysis unit 420 analyzes the extracted voiceprint information (concretely, determines whether or not it coincides with the voiceprint recorded in each list, and determines whether or not one piece of the voice data includes voiceprints of a plurality of persons). Additionally, there is no particular limitation on a timing that the voice characteristic analysis unit 420 analyzes the extracted voiceprint information. For example, it may perform matching at predetermined intervals (such as 5-second intervals) to determine whether or not a talking person can be distinguished, and when this determination cannot be made, the voice characteristic analysis unit 420 may perform the matching again. As another option, at the end of the call, it may collectively analyze the voiceprint information extracted during the call. The voice characteristic analysis unit 420 performs an appropriate process based on the analysis result (call type), as described below.

Figure 3:
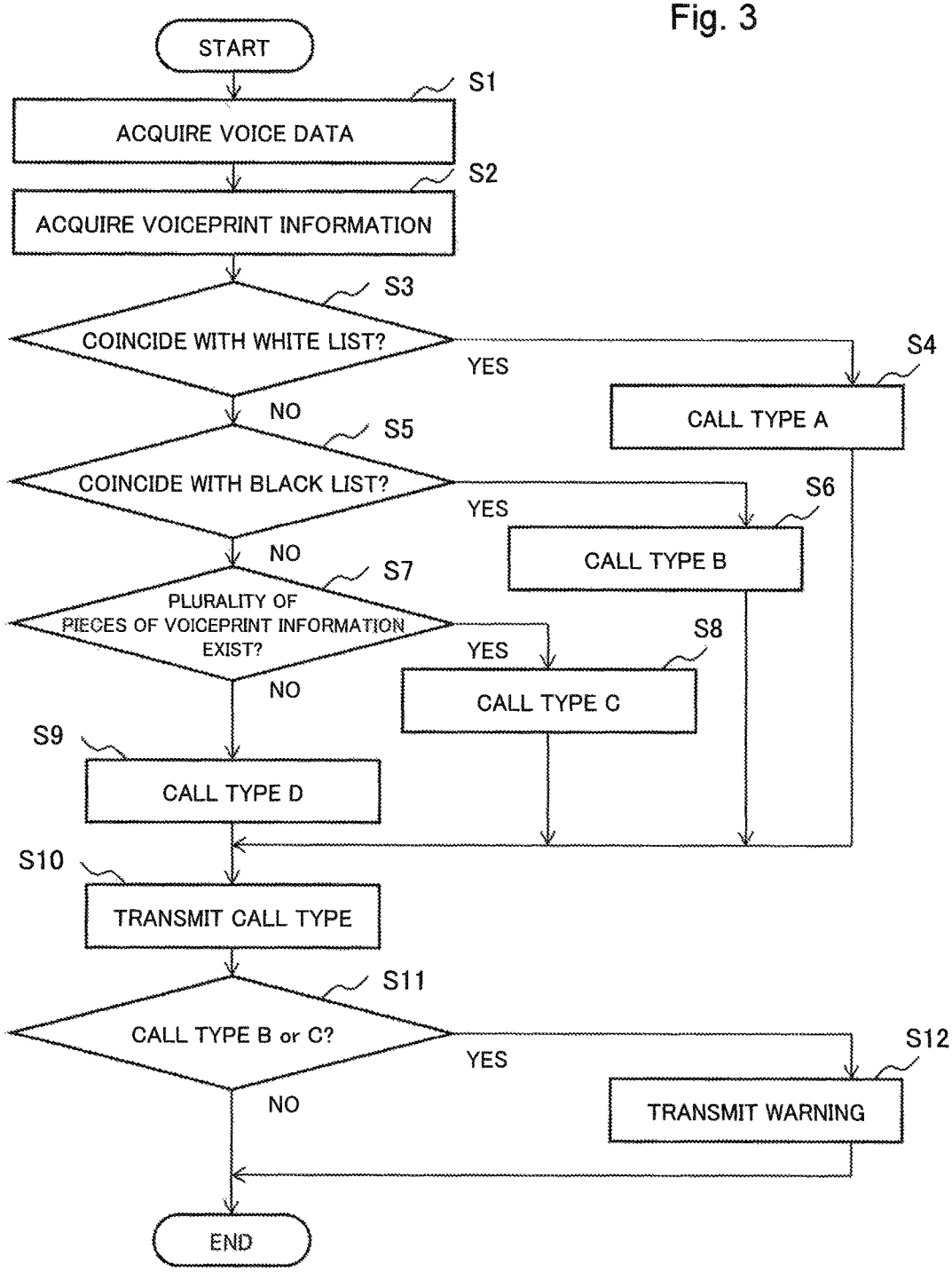
FIG. 3 is a flowchart illustrating an operation example of the caller identification server.

(Description of Operation)
FIG. 3 is a flowchart illustrating an operation example of the caller identification server 400.

The voice characteristic analysis unit 420 acquires the voice data of the caller, from the telephone network 20 via the data communication network 30 (step S1). The voice characteristic analysis unit 420 extracts voiceprint information from the acquired voice data (step S2). The voice characteristic analysis unit 420 determines whether or not the extracted voiceprint information coincides with the voiceprint information recorded in the white list 430 (step S3).

When the information coincides with the voiceprint information recorded in the white list 430 (Yes at the step S3), the voice characteristic analysis unit 420 classifies a type of the call into "a call type A (a second determination result)" (undoubtedly, the call from the close relative) (step S4).

When the information does not coincide with the voiceprint information recorded in the white list 430 (No at the step S3), the voice characteristic analysis unit 420 determines whether or not the extracted voiceprint information coincides with the voiceprint information recorded in the black list 440 (step S5).

When the information coincides with the voiceprint information recorded in the black list 440 (Yes at the step S5), the voice characteristic analysis unit 420 classifies a type of the call into "a call type B (a third determination result)" (undoubtedly, the call from the swindler) (step S6).

When the information does not coincide with the voiceprint information recorded in the black list 440 (No at the step S5), the voice characteristic analysis unit 420 determines whether or not the extracted voiceprint information includes voiceprints of a plurality of persons (step S7).

When the information includes voiceprints of a plurality of persons (Yes at the step S7), the voice characteristic analysis unit 420 classifies a type of the call into "a call type C (a first determination result)" (a call having a high possibility of being a call from a swindler) (step S8).

When the information does not include voiceprints of a plurality of persons (No at the step S7), the voice characteristic analysis unit 420 classifies a type of the call into "a call type D (a fourth determination result)" (a call having a low possibility of being a call from a swindler) (step S9).

Among frauds, there is sometimes a fraud in which a scenario is created in advance to carefully make determination about "who says what at which timing." In other words, when a plurality of persons appear in one call, the call has a high possibility of being a call from a fraud group. However, when all of those persons are not recorded in the black list, such a call is not determined as a call from a swindler by a method of making determination for a call simply on the basis of coincidence or non-coincidence with those in the black list.

In view of it, according to the first exemplary embodiment, for a call that is classified into none of a close relative and a swindler, it is determined whether or not a plurality of pieces of voiceprint information exist (i.e., whether or not a plurality of persons appear) so that a call type is classified in more detail. Concretely, call types are classified into each one of four types of the above-described call types A to D.

The voice characteristic analysis unit 420 transmits the call type (one of the call types A to D) of the call to the information terminal 220 via the data communication network 30 (step S10). The information terminal 220 displays the received call type on the screen.

The voice characteristic analysis unit 420 determines whether or not a call type of the call is the call type B (undoubtedly, a call from the swindler) or the call type C (a call having a high possibility of being a call from a swindler) (step S11). When a call type is neither the call type B nor the call type C (No at the step S11), the present flow is ended.

When a call type is the call type B or the call type C (Yes at the step S11), the voice characteristic analysis unit 420 transmits a "warning" to the related contact destination device 300 (step S12).

Examples of a method of transmitting the warning may include an email, a telephone call, push notification to an application in a smart phone, and the like. Further, the warning may be simultaneously transmitted to all of the transmission destinations (the family member of the call recipient, the service center operated by the business operator providing a telephone service, the police, and the like), or may be transmitted only to one or more specified transmission destinations. For example, the warning can be first of all transmitted only to the service center. In this case, in accordance with necessity, the service center mutually makes contact with the call recipient, the family member of the call recipient, the police, and the like to take appropriate measures for preventing a fraud.

(Description of Advantageous Effect)

In the above-described first exemplary embodiment, for a call that is classified into none of the close relative and the swindler, it is determined whether or not a plurality of pieces of voiceprint information exist (i.e., whether or not a plurality of persons appear) to classify a call type in more detail. Concretely, classification into four types of the above-described call types A to D is performed.

In other words, compared with a simple alternative determination method of making comparison only with a black list or only with a white list, the case of the present exemplary embodiment makes it difficult to cause a problem that a call from a swindler supposed to be detected is overlooked, or a person who is not a swindler is determined as a swindler, Briefly, according to the present exemplary embodiment, a call from a swindler and a call from a non-swindler can be sharply distinguished from each other with higher accuracy.

In addition, when a call type is the call type B or the call type C, the voice characteristic analysis unit 420 may transmit, to the information terminal 220, action to be taken (such as asking advice from a family member, asking advice from a person other than a family member, asking advice from the police, making a report to a call center, or the like).

Further, for asking advice from or making a report to each of the above-described contact parties, a mechanism of click-to-dial can be used so that a call for asking advice can be easily made from the information terminal 220. Furthermore, instead of click-to-dial, various methods such as email, push notification to an application in a smart phone, or making connection to a web server of the call center to ask advice can be adopted. Additionally, click-to-dial is a service in which an icon or a link displayed in a web page or the like is clicked to automatically make a call to a party.

Second Exemplary Embodiment

Figure 4:
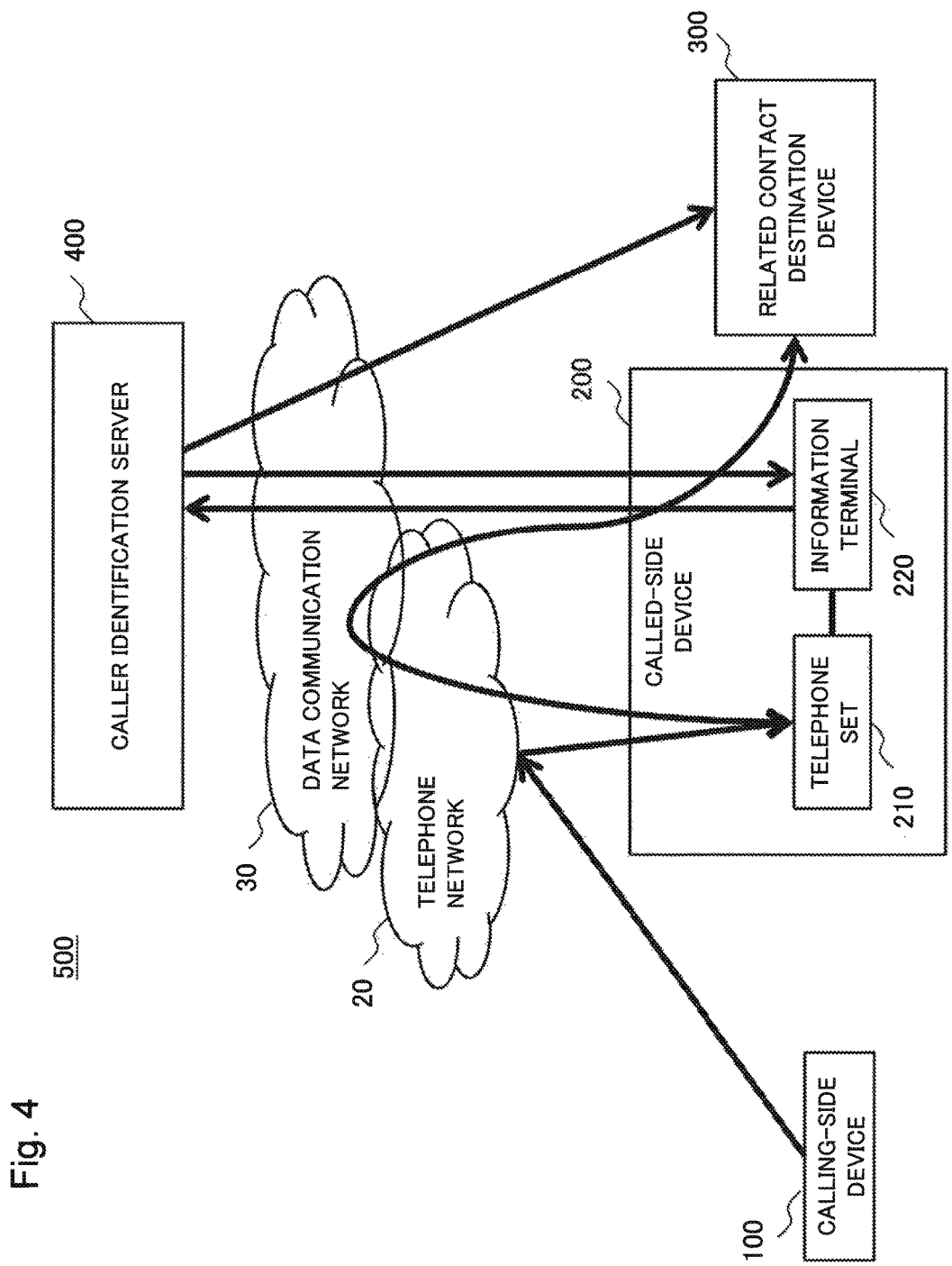
FIG. 4 is a block diagram illustrating a configuration example of a call system according to a second exemplary embodiment of the present invention.

FIG. 4 is a block diagram illustrating a configuration example of a call system 500 according to a second exemplary embodiment of the present invention. The call system 500 differs from the call system 10 (FIG. 1) in that the telephone set 210 and the information terminal 220 are connected to each other. The telephone set 210 transmits voice data of a caller to the caller identification server 400 via the information terminal 220. Thereby, it becomes unnecessary to forward the voice data from the telephone network 20 to the caller identification server 400. When setting of the telephone network 20 is changed, significantly troublesome work, such as a request of cooperation of a telecommunication carrier who provides a telephone service, is necessary. In contrast, making a configuration as in the present exemplary embodiment enables the call type identification service to be provided more simply and easily.

Additionally, without description, it is apparent that the second exemplary embodiment attains the same advantageous effects as those in the first exemplary embodiment.

Further, a program for implementing functions of all or a part of each of the above-described exemplary embodiments may be recorded in a computer-readable recording medium, and a computer system may read and execute the program recorded in this recording medium to thereby perform the processes of the respective units.

Examples of the computer system may include a central processing unit (CPU).

The "computer-readable recording medium" is a non-transitory storage device, for example. Examples of the non-transitory storage device may include a portable medium such as a magneto-optical disk, a read only memory (ROM), or a nonvolatile semiconductor memory, and a hard disk incorporated in the computer system. The "computer-readable recording medium" may be also a transitory storage device. Examples of the transitory storage device may include a communication line in the case of transmitting the program via a network such as the Internet or via a communication circuit such as a telephone circuit, or a volatile memory inside the computer system.

Besides, the above-described program may be one for implementing a part of the above-described functions, or further, may be one that can implement the above-described functions in combination with a program already recorded in the computer system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-124446, filed on Jun. 17, 2014, the disclosure of which is incorporated herein in its entirety by reference.

REFERENCE SIGNS LIST

10 Call system
20 Telephone network
30 Data communication network
100 Calling-side device
200 Called-side device
300 Related contact destination device
400 Caller identification server
410 Storage unit
420 Voice characteristic analysis unit
430 White list
440 Black list
500 Call system

The invention claimed is:

1. A caller identification apparatus comprising:
a storage unit for storing a white list in which first voice characteristic information that is voice characteristic information of a close relative of a call recipient is recorded, and a black list in which second voice characteristic information that is voice characteristic information of a swindler is recorded; and
a voice characteristic analysis unit for acquiring voice data of a call, obtaining third voice characteristic information that is voice characteristic information of the voice data, determining whether or not the third voice characteristic information coincides with the first voice characteristic information and the second voice characteristic information, determining, when the third voice characteristic information coincides with neither the first voice characteristic information nor the second voice characteristic information, determining whether or not the third voice characteristic information includes voice characteristic information of a plurality of persons, and obtaining, when the third voice characteristic information includes the voice characteristic information of a plurality of persons, a first determination result that the call has high possibility of being a call from the swindler.

2. The caller identification apparatus according to claim 1, wherein, when the third voice characteristic information coincides with the first voice characteristic information, the voice characteristic analysis unit obtains a second determination result that the call is undoubtedly a call from the close relative.

3. The caller identification apparatus according to claim 2, wherein, when the third voice characteristic information coincides with the second voice characteristic information, the voice characteristic analysis unit obtains a third determination result that the call is undoubtedly a call from the swindler.

4. The caller identification apparatus according to claim 3, wherein, when the third voice characteristic information coincides with neither the first voice characteristic information nor the second voice characteristic information, and does not include voice the characteristic information of a plurality of persons, the voice characteristic analysis unit obtains a fourth determination result that the call has low possibility of being a call from the swindler.

5. The caller identification apparatus according to claim 4, wherein the voice characteristic analysis unit determines whether or not a determination result about the call is the first determination result or the third determination result, and transmits, when the determination result is the first determination result or the third determination result, to a related contact destination device, warning information for warning that the call is a call from the swindler, the related contact destination device being connected to the caller identification apparatus via a predetermined communication network and being operated at a related contact destination.

6. The caller identification apparatus according to claim 5, wherein the related contact destination is at least one of a family member of the call recipient, a service center operated by a business operator providing a telephone service, and police.

7. The caller identification apparatus according to claim 5, wherein, when the determination result is the first determination result or the third determination result, the voice characteristic analysis unit transmits, to a called-side device, action information indicating an action to be taken by the call recipient, the called-side device being connected to the caller identification apparatus via a predetermined communication network.

8. The caller identification apparatus according to claim 7, wherein the voice characteristic analysis unit receives the voice data from the called-side device.

9. A caller identification method comprising:
storing, in a storage unit, a white list in which first voice characteristic information that is voice characteristic information of a close relative of a call recipient is recorded, and a black list in which second voice characteristic information that is voice characteristic information of a swindler is recorded;

acquiring voice data of a call, obtaining third voice characteristic information that is voice characteristic information of the voice data, and determining whether or not the third voice characteristic information coincides with the first voice characteristic information and the second voice characteristic information;

when the third voice characteristic information coincides with neither the first voice characteristic information nor the second voice characteristic information, determining whether or not the third voice characteristic information includes voice characteristic information of a plurality of persons; and when the third voice characteristic information includes the voice characteristic information of a plurality of persons, obtaining a first determination result that the call has high possibility of being a call from the swindler.

10. A non-transitory recording medium on which a caller identification program is stored, the program causing a computer of a caller identification apparatus to execute:

processing of storing, in a storage unit, a white list in which first voice characteristic information that is voice characteristic information of a close relative of a call recipient is recorded, and a black list in which second voice characteristic information that is voice characteristic information of a swindler is recorded;

processing of acquiring voice data of a call, obtaining third voice characteristic information that is voice characteristic information of the voice data, and determining whether or not the third voice characteristic information coincides with the first voice characteristic information and the second voice characteristic information;

processing of, when the third voice characteristic information coincides with neither the first voice characteristic information nor the second voice characteristic information, determining whether or not the third voice characteristic information includes voice characteristic information of a plurality of persons; and processing of, when the third voice characteristic information includes the voice characteristic information of a plurality of persons, obtaining a first determination result that the call has high possibility of being a call from the swindler.

* * * * *